United States Patent
Sparks

[19]

[11] Patent Number: 5,915,281
[45] Date of Patent: Jun. 22, 1999

[54] SILICON FORCE AND DISPLACEMENT SENSOR

[75] Inventor: Douglas Ray Sparks, Kokomo, Ind.

[73] Assignee: Delco Electronics Corporation, Kokomo, Ind.

[21] Appl. No.: 08/942,840

[22] Filed: Oct. 3, 1997

[51] Int. Cl.[6] ........................................................ G01L 1/02
[52] U.S. Cl. .................................................... 73/862.581
[58] Field of Search .............................. 73/754, 862.581; 338/47

[56] References Cited

U.S. PATENT DOCUMENTS

| | | | |
|---|---|---|---|
| 3,828,294 | 8/1974 | Baba et al. | 338/43 |
| 4,314,225 | 2/1982 | Tominaga et al. | 338/4 |
| 4,686,764 | 8/1987 | Adams et al. | 29/592 |
| 4,993,265 | 2/1991 | Koen et al. | 73/706 |
| 5,161,415 | 11/1992 | Kodama et al. | 73/708 |
| 5,353,003 | 10/1994 | Maurer | 338/47 |
| 5,357,673 | 10/1994 | Polak et al. | 29/840 |
| 5,661,245 | 8/1997 | Svoboda et al. | 73/726 |

Primary Examiner—Richard Chilcot
Assistant Examiner—Jewel V. Thompson
Attorney, Agent, or Firm—Jimmy L. Funke

[57] ABSTRACT

A silicon sensing cell (12) capable of sensing force and/or displacement, and particular embodiments of the sensing cell (12) for particular force and/or displacement-sensing applications. The sensing cell (12) generally includes a diaphragm (18), a silicon sensing element (28) operatively associated with the diaphragm (18) to sense strain or deflection of the diaphragm (18), a base (14) supporting the diaphragm (18) so that the base (14) and the diaphragm (18) define a recess (22), and a force-distributing member (20) within the recess (22) and contacting the diaphragm (18). The diaphragm (18) is preferably single-crystal silicon, and the sensing element (28) can be a piezoresistive, piezoelectric or capacitive element preferably formed in the diaphragm (18) using semiconductor fabrication processes. With appropriate adaptations, the sensing cell (12) can be made suitable for automotive applications such as seat occupancy sensing, brake-by-wire and acceleration-by-wire pedal systems, and media-compatible high-pressure sensing in brake, oil and transmission fluid applications.

29 Claims, 2 Drawing Sheets

SILICON FORCE AND DISPLACEMENT SENSOR

FIELD OF THE INVENTION

The present invention generally relates to force and displacement sensing devices. More particularly, this invention relates to a silicon sensor that is readily manufacturable and capable of accurately sensing force and displacement.

BACKGROUND OF THE INVENTION

There is a continuous effort to develop sensors that are lower in cost and smaller in size, yet are characterized by high reliability, sensitivity and linearity. Pressure sensors finding wide acceptance on the basis of furthering these characteristics include those that utilize semiconductor materials with a micromachined sensing diaphragm, a notable example being micromachined single-crystal silicon pressure transducer cells manufactured using semiconductor fabrication processes. In the processing of such cells, a thin diaphragm is typically formed in a silicon wafer through preferential chemical etching. Ion implantation and diffusion techniques are then used to drive doping elements into the diaphragm, forming piezoresistive elements whose electrical conductivity changes with strain such that deflection of the diaphragm causes a change in resistance value of the piezoresistive elements, which can then be correlated to the magnitude of the pressure applied to the diaphragm. Silicon pressure sensing cells that rely on piezoelectric and capacitive sensing have also been produced.

Diaphragms of single-crystal silicon pressure sensing cells are typically small, rarely exceeding a few millimeters in width, and are very thin, with a thickness of often less than 100 micrometers. The use of standard single-crystal silicon wafers and standard semiconductor device fabrication processes allows many such cells to be fabricated from a single wafer, providing some economy of scale. However, silicon is susceptible to chemical attack and erosion by various media, particularly in applications where a high-pressure medium is to be sensed, e.g., automotive applications that involve sensing brake fluid, oil, transmission fluid, hydraulic fluid, fuel and steering fluid pressures. Consequently, for high-pressure sensing applications, a silicon pressure sensing cell requires some form of protection, such as a protective enclosure that complicates the manufacture and increases production costs.

Silicon sensors have found limited use for sensing force and displacement because of the brittle nature of the silicon materials. As a result, current methods for producing force and displacement sensors include the use of metal foil strain gauges placed over a diaphragm, electrostatic or capacitive sensing structures, magnetic or ultrasonic measurement techniques, and the compression of conductive gels. Attempts to employ silicon micromachined sensing cells to sense force and displacement have included enclosing a silicon cell in a fluid or gas-filled container. However, compression of the container does little to change the pressure of the fluid, with the result that the sensor output does not change significantly with force. U.S. Pat. No. 5,353,003 to Maurer discloses a force sensor that employs a shaft and resilient material to transmit force to a silicon dioxide force-sensing diaphragm. However, as a moving component that must remain free to move throughout the useful life of the force sensor, the requirement for a shaft to transmit force to the silicon dioxide diaphragm limits the usefulness and life of this type of sensor.

In view of the above, it is apparent that the above sensors and/or their manufacturing processes have limitations and drawbacks. For example, silicon sensing cells adapted for high pressure applications suffer from low sensitivity and complicated manufacturing processes that render the sensors incompatible with mass-production applications, while silicon sensing cells adapted for sensing force have found limited use due to the brittle nature of silicon. Accordingly, there is a need for a sensor that attains the high reliability and sensitivity associated with silicon sensing cells, yet is capable of sensing force and displacement for a variety of applications, is relatively uncomplicated and is low in cost.

SUMMARY OF THE INVENTION

It is an object of this invention to provide a silicon sensing cell capable of sensing force and/or displacement.

It is another object of this invention that the sensing cell employs a single-crystal silicon diaphragm manufactured using semiconductor fabrication processes.

It is another object of this invention that the sensing cell is mechanically robust and readily manufacturable to be compatible with mass-production techniques.

In accordance with a preferred embodiment of this invention, these and other objects and advantages are accomplished as follows.

The present invention provides a silicon sensing cell capable of sensing force and/or displacement, and particular embodiments of the sensing cell for particular force and/or displacement-sensing applications. With appropriate adaptations, the sensing cell of this invention can be made suitable for automotive applications such as seat occupancy sensing, brake-by-wire and acceleration-by-wire pedal systems, and media-compatible high-pressure sensing in brake, oil and transmission fluid applications.

The sensing cell of this invention generally includes a diaphragm, a silicon sensing element operatively associated with the diaphragm to sense strain or deflection of the diaphragm, a base supporting the diaphragm so that the base and the diaphragm define a recess, and a force-distributing member within the recess and contacting the diaphragm. The diaphragm is preferably single-crystal silicon, and the sensing element can be a piezoresistive, piezoelectric or capacitive element preferably formed in the diaphragm using semiconductor fabrication processes.

In a particular embodiment in which displacement is to be employed to sense fluid pressure, the force-distributing member is formed of a pliable material. The sensing cell further includes a flexible member that contacts the pliable force-distributing member and a fluid, such that changes in pressure of the fluid cause the flexible member to flex and thereby transmit a force and displacement to the diaphragm through the pliable force-distributing member. In another embodiment in which a bidirectional sensing capability is required, the force-distributing member is pliable, with a preferably rigid member attached to the force-distributing member such that movement of the member toward and away from the force-distributing member transmits a force to the diaphragm through the force-distributing member. In an embodiment in which either a force or displacement can be sensed, a flexible member contacts both the force-distributing member and the base, such that force applied to the flexible member is transmitted to the diaphragm through the force-distributing member. In this embodiment, the force-distributing member can be integral with the diaphragm and base, and the flexible member can be modified or coupled with additional members to tailor the sensitivity of the diaphragm.

The above-described sensing cells can be attached to or enclosed in a protective frame or housing by attachment with the base or flexible member. In addition, the sensing cell of this invention can be equipped with signal conditioning circuitry that is electrically interconnected with the sensing element. The signal conditioning circuitry may be formed on a silicon chip mounted directly to the diaphragm of the sensing cell.

According to this invention, the above structures and processes yield a force or displacement sensing cell that benefits from the sensitivity of silicon sensing technology, yielding a sensing cell that is highly sensitive and readily manufacturable, yet is also mechanically robust. Notably, the sensing cell is not encumbered by the fluid-filled containers and moving parts required for silicon force sensors of the prior art. In addition, the sensitivity of the sensing cell can be readily tailored by thinning the diaphragm and modifying the force-distributing member and the flexible member (if present) in order to adapt the sensing cell to a variety of applications.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

FIGS. 1, 2, 5 and 6 represent sensor assemblies in accordance with various embodiments of this invention. Each of the sensor assemblies employs silicon sensing structures to accurately sense a force and/or displacement. From the following discussion, it will be seen that a variety of sources for the force or displacement can be accommodated. While specific embodiments are provided, those skilled in the art will appreciate that sensor assemblies within the scope of this invention can differ in construction and appearance from the particular configurations portrayed in the Figures.

Figure 1:
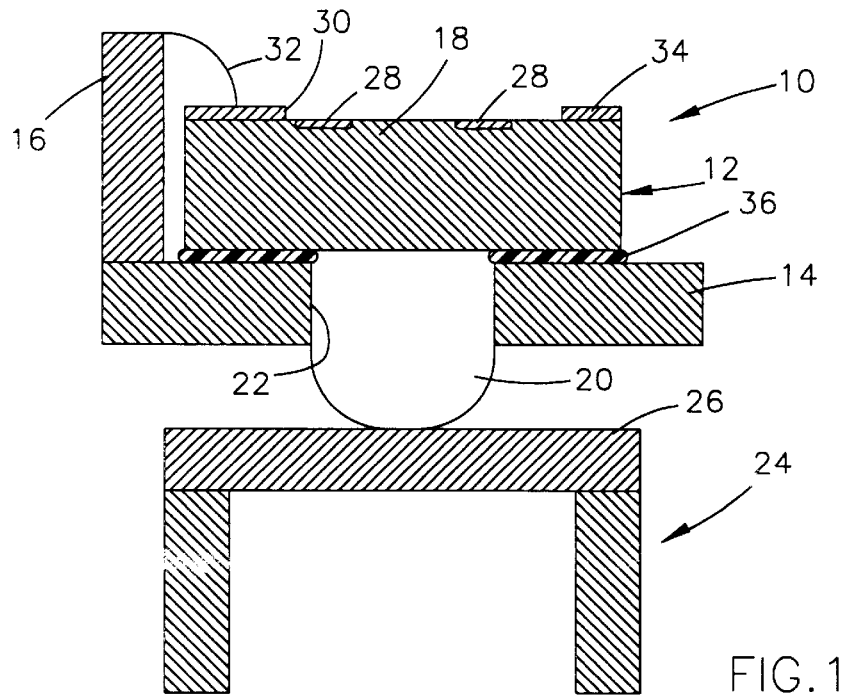
FIG. 1 is a cross-sectional view of a sensor assembly that senses pressure in a container by sensing displacement of a container wall in accordance with a first embodiment of this invention.

FIG. 1 represents a force or displacement sensor assembly 10 adapted to sense a change in pressure of a fluid within a container 24. The sensor assembly 10 includes a silicon sensing cell 12 in accordance with the present invention. As illustrated, the sensor assembly 10 further includes a base 14 on which the cell 12 is mounted, and a frame 16 to which the base 14 is attached for support and/or mounting to additional structure. The cell 12 is formed to have a diaphragm 18 that is capable of deflecting in response to a force applied by a force-distributing member 20. As shown in FIG. 1, the diaphragm 18 closes an opening in the base 14, forming a recess 22 in which the force-distributing member 20 resides. In the embodiment of FIG. 1, the force-distributing member 20 protrudes from the recess 22, and contacts a wall 26 of the container 24. The wall 26 is specifically configured to deflect in response to changes in pressure of a fluid within the container 24, such that the wall 26 displaces the force-distributing member 20 toward the diaphragm 18. Accordingly, the embodiment of FIG. 1 is suited for a variety of applications, such as sensing pressure of brake fluid, transmission fluid, hydraulic fluid, water, antifreeze or fuel.

As also shown in FIG. 1, sensing elements 28 are formed in the surface of the diaphragm 18. As depicted in the Figures, the sensing elements 28 can be piezoresistors formed by conventional semiconductor processing techniques, e.g., ion implantation and diffusion techniques in which doping elements are driven into the surface of the diaphragm 18. Alternatively, the sensing elements 28 can be piezoelectric and capacitive sensing elements formed by similar or other suitable methods. While a single pair of sensing elements 28 is shown, it will be understood that any number of sensing elements could be used, such as for the purpose of using a Wheatstone bridge to process the output of four piezoresistive sensing elements. As also indicated in FIG. 1, a metal bond pad 30 is present on the surface of the sensing cell 12, such that wire bonding 32 can be used to electrically connect the cell 12 to appropriate features on the frame 16, which may include a connector to enable the sensor assembly 10 to be used as a sensing module. The sensing cell 12 may also include a silicon chip 34 having signal conditioning circuitry thereon, such as CMOS, BIC-MOS or bipolar integrated circuit technology, to provide compensation for output errors produced as a result of temperature effects and extraneous stresses.

The sensing cell 12 and its diaphragm 18 are a monolithic structure, preferably a single-crystal silicon chip that has been processed using known silicon processing techniques. The base 14 can be plastic, metal, silicon, glass, ceramic or another suitably rigid material. Depending on the material of the base 14, the cell 12 can be secured to the base 14 in any suitable manner, including the use of a bonding material 36 such as solder, epoxy adhesives, etc.

In the embodiment of FIG. 1, the force-distributing member 20 is formed of a soft, pliable material attached to the diaphragm 18. While the force-distributing member 20 could foreseeably be attached to the opposite surface of the diaphragm 18, wirebond fatigue could possibly result. Suitable pliable materials include silicone rubber, RTV and gels, alone or in combination. Because the deflection of the container wall 26 is applied directly to the pliable force-distributing member 20, the force transmitted to the diaphragm 18 is more uniformly distributed and reduced, such that scratching and breakage of the brittle silicon diaphragm 18 is prevented. Because minimal deflection of the diaphragm 18 actually occurs, the diaphragm 18 effectively functions as a silicon strain gauge whose output is indicative of the level of pressure within the container 24.

Figure 2:
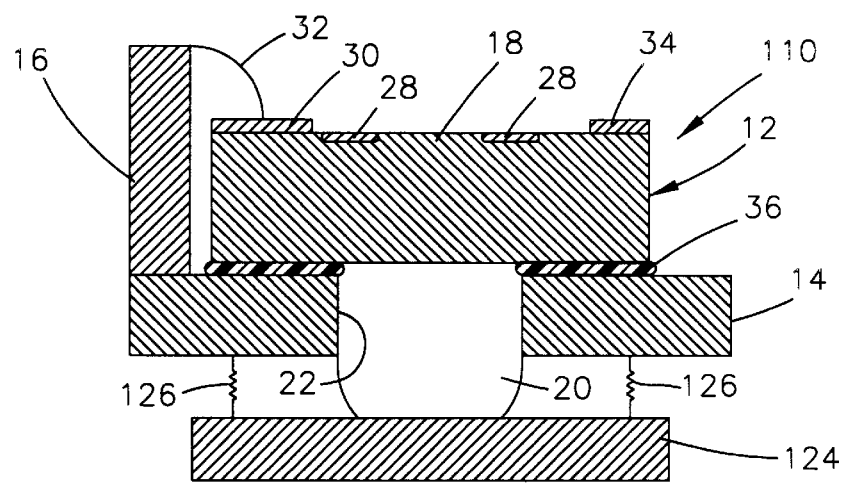
FIG. 2 is a cross-sectional view of a sensor assembly capable of bidirectional displacement and force sensing in accordance with a second embodiment of this invention.

With reference now to FIG. 2, a second embodiment of the invention is shown in which a sensor assembly 110 with identical components (identified by the same reference numbers as that used in FIG. 1) can be modified to achieve a bidirectional force and/or displacement sensing capability. As shown in FIG. 2, a plate 124 is secured to the pliable force-distributing member 20, such that movement of the plate 124 toward and away from the sensor assembly 110 will cause compression and tension, respectively, in the force-distributing member 20. Consequently, the surface of the diaphragm 18 in which the piezoresistive sensing elements 28 are formed will be in tension or compression depending on the direction of movement of the plate 124. A pair of springs 126 are shown between the plate 124 and force-distributing member 20. The springs 126 can be employed to maintain contact between the plate 124 and force-distributing member 20, or to tailor the level of force or displacement transmitted to the diaphragm 18.

Figure 3:
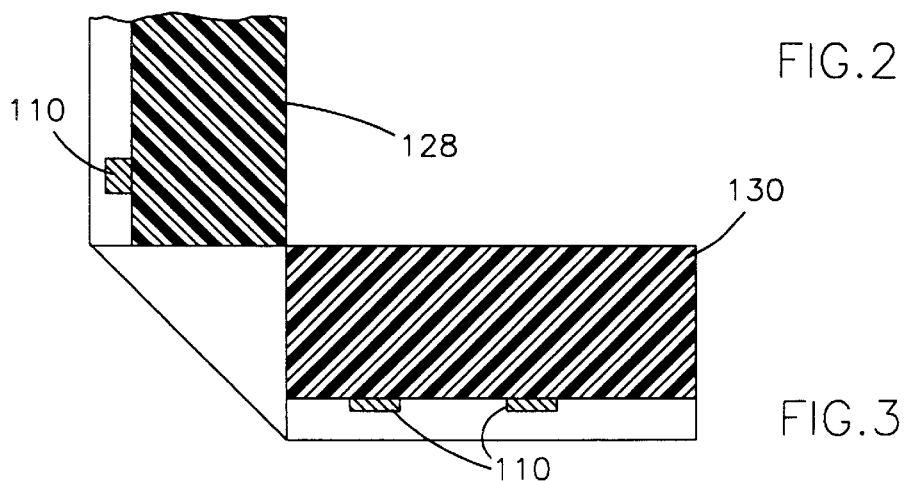
FIG. 3 is a cross-sectional view illustrating the use of the sensor assembly of FIG. 2 for sensing seat occupancy.

FIG. 3 illustrates a particular application for the sensor assembly 110 of FIG. 2. As depicted, the sensor assembly 110 serves as a seat occupancy sensor which can be employed to arm or disarm an automotive passive restraint system (e.g., air bags). FIG. 3 portrays three sensor assemblies 110 located in the seat back 128 and cushion 130 of an automobile, though the use of additional units and other locations are foreseeable. The role of the sensors is to indicate if a seat is occupied by an adult.

Figure 4:
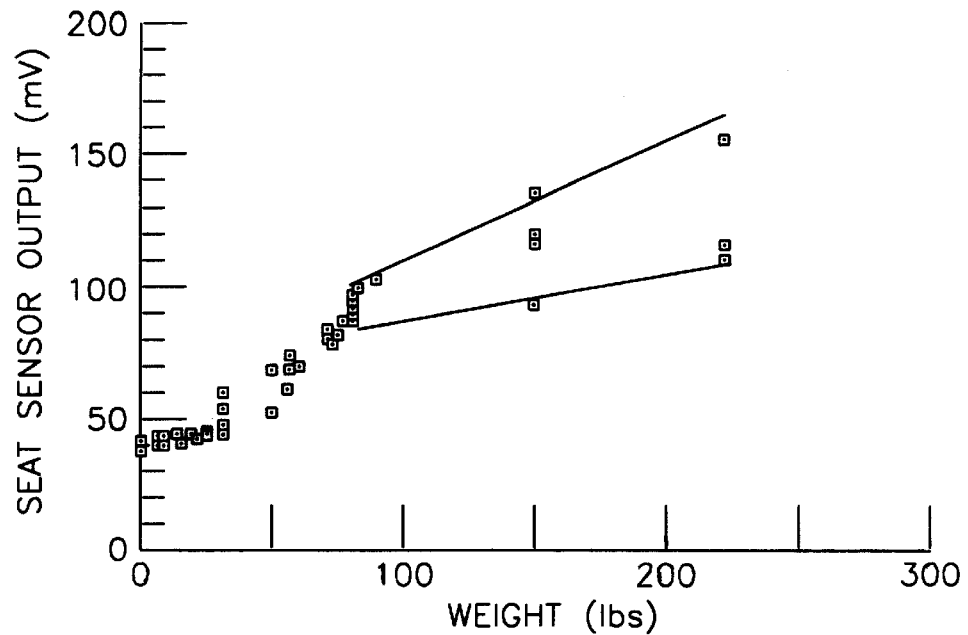
FIG. 4 is a graph representing the output characteristics of the sensor assembly of FIG. 2 when used to sense seat occupancy in accordance with FIG. 3.

Weight versus sensor output data obtained from tests performed on a seat equipped with a sensor assembly 110 is shown in FIG. 4. The testing that produced the data of FIG. 4 involved the placement of sensor assemblies under a car seat cushion and secured to the seat frame. A thin rigid plate of the type shown in FIG. 2 was placed over each sensor to increase sensitivity. Weights were then placed on the seat cushion to incrementally increase the total weight, with the output of the sensor assemblies being recorded with each incremental increase. From the data, it can be seen that the output of the sensor assemblies provided a reliable basis for arming an air bag only when an adult is seated on a seat. In the test, a large signal increase was observed when more than about 60 to 70 pounds (about 270 to 310 newtons) was applied to the seat cushion, which under the test conditions would allow the use of a signal threshold of about 75 mV to control a passive restraint system in order to prevent an air bag from deploying while a child or small adult occupied the seat. Those skilled in the art will appreciate that, in an automotive application, the millivolt sensor signal would typically be amplified, for example, to a 0–5 V output.

Figure 5:
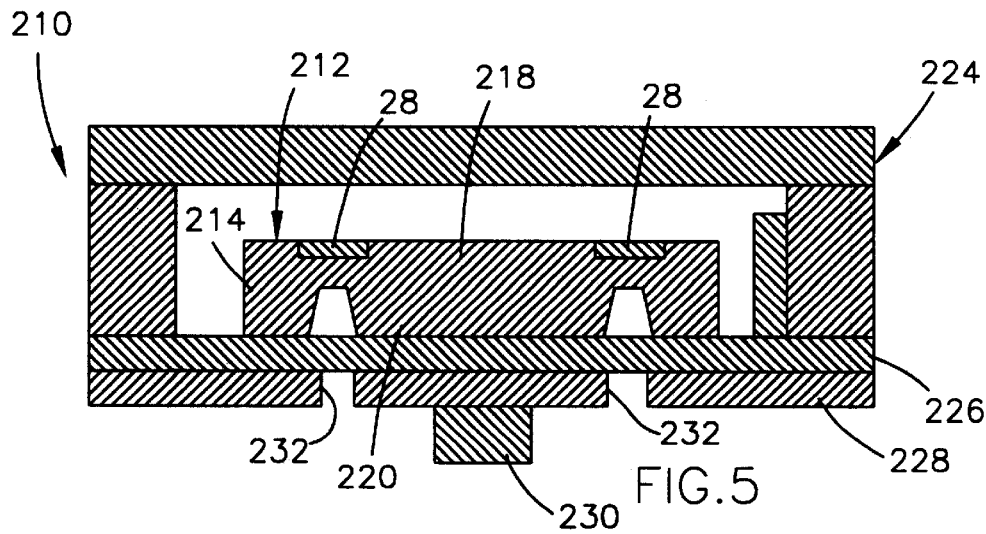
FIGS. 5 and 6 are cross-sectional views of sensor assemblies adapted for sensing displacement and force in accordance with further embodiments of this invention.
Figure 6:
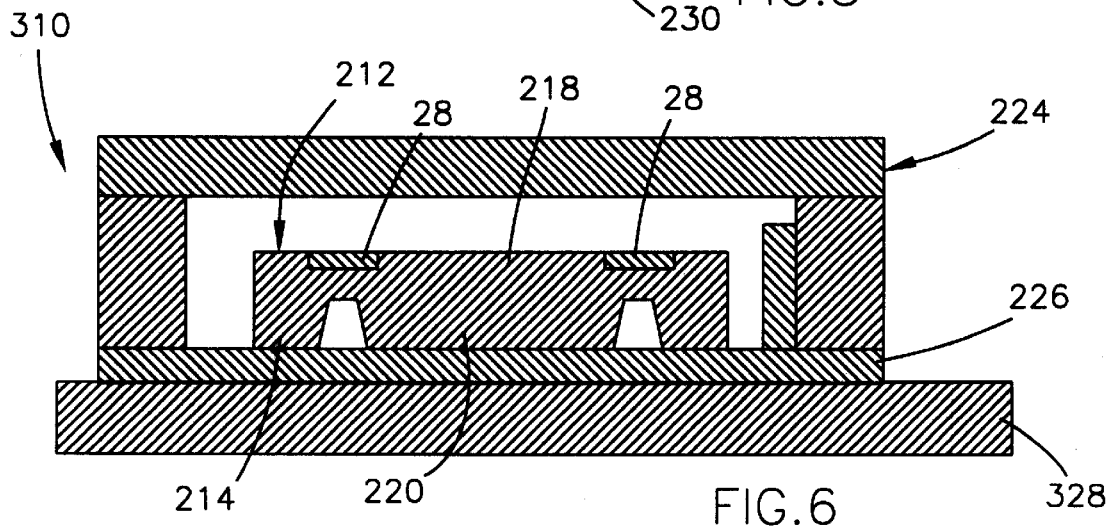

FIGS. 5 and 6 illustrate additional embodiments of this invention in which a rigid force-distributing member 220 is used, though the basic characteristics, operation and benefits of the sensor assemblies 10 and 110 are retained. In FIG. 5, a force or displacement sensor assembly 210 is shown as including a housing 224. As with the embodiments of FIGS. 1 and 2, the sensor assembly 210 includes a silicon sensing cell 212, but with the cell 212 being formed integral with a base 214, diaphragm 218 and force-distributing member 220 from a silicon wafer by conventional micromachining processes using known etching techniques. As such, the force-distributing member 220 is not soft or pliable, but instead is rigid. Accordingly, the ability of the force-distributing member 220 to uniformly distribute a load on the diaphragm 218 is dependent in part on its shape and its physical interface with the diaphragm 218. The base 214 and force-distributing member 220 are shown as having coplanar surfaces attached to a flexible member 226 which, because of its attachment to both the base 214 and force-distributing member 220, acts to absorb excessive loads, transmitting only a roughly proportional force or displacement that can be withstood by the diaphragm 218. Suitable materials for the flexible member 226 include various metals and plastics.

In FIG. 5, the flexible member 226 is specifically configured to deflect bidirectionally in response to a force applied to a button 230 mounted to a grooved baseplate 228. Grooves 232 in the baseplate 228 serve to localize bending in certain regions of the flexible member 226, such as at the micromachined groove between the force-distributing member 220 and the base 214. The stiffness of the baseplate 228 can be tailored in order to impart a desirable level of rigidity in those areas of the flexible member 226 where flexing is to be curbed or unnecessary. While shown as being formed separately, the flexible member 226, baseplate 228 and button 230 could be formed together as a single component, such as by stamping, machining, etc. As depicted, the sensor assembly 210 would be useful as a load cell for numerous applications, particularly for sensing loads of less than 1 kilogram (about 10 N) up to in excess of 1000 kilograms (about 10 kN).

Finally, in FIG. 6 a sensor assembly 310 is shown which is basically of the same construction of the assembly 210 of FIG. 5, but with the flexible member 226 secured to a cantilevered beam 328. As such, bending of the beam 328 relative to one of its ends causing a displacement of the beam 328 toward or away from the force-distributing member 220 and diaphragm 218. In this embodiment, the sensor assembly 310 would be used as a strain gauge.

In view of the above, one skilled in the art will appreciate that each of the sensing cells of this invention provides the operational advantages of single-crystal silicon technology, yet further has the advantage of being adapted for sensing force and displacement in a variety of applications. The sensitivity of sensors utilizing the sensor cells can be readily tailored by altering the thickness of the diaphragm, appropriate modifications to the force-distributing member, and the inclusion of flexible members and baseplates secured to the cells. The result is a force/displacement sensor that is amenable to manufacturing methods that yield relatively low cost sensors capable of accurately sensing forces of less than 1 N up to at least 10 kN, while simultaneously achieving high reliability and high performance within a relatively small sensor package. Notably, very high levels of force and displacement can be sensed with the cells of this invention as long as the force or displacement can be reduced to an acceptable level at the diaphragm, while allowing for calibration by analytical or experimental methods.

While our invention has been described in terms of a preferred embodiment, other forms could be adopted by one skilled in the art. Accordingly, the scope of our invention is to be limited only by the following claims.

What is claimed is:

1. A force sensor assembly comprising:

a diaphragm;

a silicon sensing element operatively associated with the diaphragm to sense deflection of the diaphragm;

a base supporting the diaphragm so that the base and the diaphragm define a recess;

a pliable force-distributing member within the recess and contacting the diaphragm, the force-distributing member having a portion projecting from the recess;

a flexible member contacting the force-distributing member; and a fluid contacting the flexible member, whereby changes in pressure of the fluid cause the flexible member to flex and thereby transmit a force to the diaphragm through the force-distributing member.

2. A force sensing assembly as recited in claim 1, wherein the flexible member contacts the portion of the force-distributing member projecting from the recess.

3. A force sensing assembly as recited in claim 1, wherein the flexible member is a wall of a fluid reservoir containing the fluid.

4. A force sensing assembly as recited in claim 3, wherein the fluid is chosen from the group consisting of brake fluid, transmission fluid, hydraulic fluid, water, antifreeze and fuel.

5. A force sensing assembly as recited in claim 1, further comprising signal conditioning circuitry electrically interconnected with the silicon sensing element.

6. A force sensing assembly as recited in claim 5, wherein the signal conditioning circuitry is on a semiconductor chip mounted to the base.

7. A force sensing assembly as recited in claim 1, wherein the diaphragm is bonded to the base.

8. A force sensing assembly as recited in claim 1, wherein the silicon sensing element is a piezoresistive element.

9. A force sensing assembly as recited in claim 1, wherein the diaphragm is formed of silicon and the silicon sensing element is formed in the surface of the diaphragm.

10. A force sensor assembly comprising:

a diaphragm;

a silicon sensing element operatively associated with the diaphragm to sense deflection of the diaphragm;

a base supporting the diaphragm so that the base and the diaphragm define a recess;

a pliable force-distributing member within the recess and contacting the diaphragm; and a member attached to the force-distributing member, whereby movement of the member toward and away from the force-distributing member transmits a force to the diaphragm through the force-distributing member, such that force sensing with the silicon sensing element is bidirectional.

11. A force sensing assembly as recited in claim 10, wherein the force-distributing member has a portion projecting from the recess, the member contacting the portion of the force-distributing member.

12. A force sensing assembly as recited in claim 10, wherein the member is a rigid planar member.

13. A force sensing assembly as recited in claim 10, wherein the member is biased away from the diaphragm.

14. A force sensing assembly as recited in claim 10, wherein the member is disposed in an automobile passenger seat, and wherein the force sensing assembly senses the presence of an occupant in the automobile passenger seat.

15. A force sensing assembly as recited in claim 10, further comprising signal conditioning circuitry electrically interconnected with the silicon sensing element.

16. A force sensing assembly as recited in claim 15, wherein the signal conditioning circuitry is on a semiconductor chip mounted to the base.

17. A force sensing assembly as recited in claim 10, wherein the diaphragm is bonded to the base.

18. A force sensing assembly as recited in claim 10, wherein the silicon sensing element is a piezoresistive element.

19. A force sensing assembly as recited in claim 10, wherein the diaphragm is formed of silicon and the silicon sensing element is formed in the surface of the diaphragm.

20. A force sensor assembly comprising:

a diaphragm;

a silicon sensing element operatively associated with the diaphragm to sense deflection of the diaphragm;

a base supporting the diaphragm so that the base and the diaphragm define a recess;

a rigid force-distributing member within the recess and contacting the diaphragm;

a flexible member contacting the force-distributing member and the base, whereby a force applied to the flexible member is transmitted to the diaphragm through the force-distributing member.

21. A force sensing assembly as recited in claim 20, wherein the force-distributing member and the base have surfaces that are substantially coplanar and attached to the flexible member.

22. A force sensing assembly as recited in claim 20, further comprising a baseplate attached to the flexible member, the baseplate having grooves therein for altering the flexure characteristics of the flexible member.

23. A force sensing assembly as recited in claim 20, further comprising a cantilevered baseplate attached to the flexible member.

24. A force sensing assembly as recited in claim 20, further comprising signal conditioning circuitry electrically interconnected with the silicon sensing element.

25. A force sensing assembly as recited in claim 24, wherein the signal conditioning circuitry is on a semiconductor chip mounted to the base.

26. A force sensing assembly as recited in claim 20, wherein the diaphragm is an etched structure of the base.

27. A force sensing assembly as recited in claim 20, wherein the diaphragm and the force-distributing member are etched structures of the base.

28. A force sensing assembly as recited in claim 20, wherein the silicon sensing element is a piezoresistive element.

29. A force sensing assembly as recited in claim 20, wherein the diaphragm, force-distributing member and base are formed of silicon and the silicon sensing element is formed in the surface of the diaphragm.

\* \* \* \* \*